United States Patent [19]

Kuratsu et al.

[11] Patent Number: 4,785,681
[45] Date of Patent: Nov. 22, 1988

[54] GEAR-CHANGE APPARATUS FOR VEHICLE TRANSMISSION

[75] Inventors: Hideki Kuratsu; Yoshihiro Yoshimura; Noboru Sekine; Yasuo Kima, all of Saitama, Japan

[73] Assignee: Honda Giken Kogyo Kabushiki Kaisha, Tokyo, Japan

[21] Appl. No.: 855,831

[22] Filed: Apr. 24, 1986

[30] Foreign Application Priority Data

Apr. 24, 1985 [JP] Japan ................. 60-88145
Apr. 24, 1985 [JP] Japan ................. 60-88146

[51] Int. Cl.⁴ ............................... F16H 3/38
[52] U.S. Cl. ........................ 74/339; 74/475; 192/4 C
[58] Field of Search ............ 74/333, 342, 339, 471 R, 74/475, 477; 192/4 C

[56] References Cited

U.S. PATENT DOCUMENTS

| | | | |
|---|---|---|---|
| 3,745,847 | 7/1973 | Werner et al. | 74/339 |
| 4,016,773 | 4/1977 | Galas et al. | 74/339 |
| 4,022,079 | 5/1977 | Hidaka | 74/477 |
| 4,181,036 | 1/1980 | Janke | 74/477 |
| 4,221,283 | 9/1980 | Nordkvist et al. | 192/4 C |
| 4,237,745 | 12/1980 | Katayama et al. | 74/339 |
| 4,277,983 | 7/1981 | Izumi et al. | 74/475 X |
| 4,377,093 | 3/1983 | Janson | 74/339 X |
| 4,503,957 | 3/1985 | Ikemoto et al. | 74/339 X |
| 4,509,385 | 4/1985 | Inui et al. | 74/475 X |
| 4,510,819 | 4/1985 | Inui | 192/4 C X |
| 4,531,418 | 7/1985 | Takahasi et al. | 74/475 X |
| 4,531,424 | 7/1985 | Hiraiwa et al. | 74/475 X |
| 4,583,418 | 4/1986 | Nakayama et al. | 74/475 |
| 4,601,214 | 7/1986 | Fukuchi | 192/4 C X |
| 4,614,129 | 9/1986 | Skog | 74/475 X |

FOREIGN PATENT DOCUMENTS

68848 5/1984 Japan .

Primary Examiner—Rodney H. Bonck
Assistant Examiner—Richard M. Lorence
Attorney, Agent, or Firm—Lyon & Lyon

[57] ABSTRACT

A gear-change apparatus for a vehicle transmission having multiple forward speed gear trains and one reverse gear train that is established by a slide meshing action of a reverse idler gear. A cam mechanism between the reverse gear shift fork and one of the forward gear shift forks causes that forward gear shift fork to move a small stroke toward gear engagement to engage the synchronizing mechanism to stop or reduce inertial rotation of components within the transmission without actually causing engagement of that forward gear, which function occurs just prior to actual engagement of the reverse gear train. A recess in the interlocking plate permits the small stroke of movement of the forward shift fork. In one embodiment the cam mechanism includes a one-way device to eliminate any substantial resistance to shifting the apparatus out of reverse gear.

8 Claims, 11 Drawing Sheets

GEAR-CHANGE APPARATUS FOR VEHICLE TRANSMISSION

The present invention relates to a gear-change apparatus for a vehicular transmission having a plurality of forward gear trains each established through an associated synchronizing mechanism, and a reverse gear train established by the slide meshing action of a reverse idler gear. More particularly, the present invention pertains to an improvement in this type of change-gear apparatus which is capable of preventing the generation of abnormal gear noise which would otherwise occur when the reverse idler gear is shifted so as to establish the reverse gear train.

In this type of transmission, when the clutch is first disengaged in order to establish the reverse gear train, the input shaft that has been rotating by the force transmitted from the engine continues to rotate by inertia for a short period of time. For this reason, when the shift movement, that is, the slide meshing action, of the reverse idler gear is effected during the inertial rotation of the input shaft, abnormal gear noise, or so-called gear squeak, is generated, which makes an occupant feel unpleasant.

In one form of gear-change apparatus arranged to overcome the above-described disadvantage, which is disclosed in the specification of Japanese Utility Model Laid-Open No. 68848/1984, a resilient or spring mechanism is provided between the reverse shift fork for shifting the reverse idler gear from the inoperative position to the reverse gear train establishing position thereof and the forward shift fork for establishing one forward gear train. The spring mechanism is capable of shifting the forward shift fork in the direction in which the one forward gear train is established in response to the movement of the reverse shift fork from the inoperative position to reverse gear train establishing position of the reverse idler gear. The spring mechanism is arranged such that when receiving an actuating load larger than a predetermined value, the spring mechanism is so deformed as to lose its function to shift the forward shift fork. When the forward shift fork is shifted by the spring mechanism, the shift piece of the forward shift fork and the recessed bottom surface of an interlocking plate which faces the forward shift fork are brought into contact with each other in order to cause the synchronizing mechanism corresponding to the forward shift fork to effect only the synchronizing action thereof, whereby the inertial rotation of the input shaft is stopped or reduced by the synchronizing action of the synchronizing mechanism immediately before the reverse gear train is established.

Various other types of devices have been proposed for arresting the inertial rotation of a shaft or gear, particularly a reverse gear, in a transmission for avoiding undesirable noise and wear otherwise caused by the engagement of the gears including devices disclosed in U.S. Pat. Nos. 3,745,847, 4,016,773, 4,181,036 and 4,503,957, each of which have some deficiencies.

In the above-described conventional apparatus, when the reverse shift fork is quickly actuated, the spring mechanism may be deformed at an undesirably early stage, that is, during the synchronizing operation of the synchronizing mechanism, resulting in unsatisfactory suppression of the inertial rotation of the input shaft. In addition, every time the reverse shift fork is actuated, the deformation load of the spring mechanism acts on the respective abutments of the shift piece and the interlocking plate, thus not only resulting in a collision noise but also causing the durability of the abutments to be somewhat impaired. Further, the spring mechanism is actuated not only when the reverse shift fork is moved forward but also when it moves backward and, therefore, it requires an increased force to actuate the fork in the forward direction that produces an undesirable resistance in the operating feeling.

It is an object of the present invention to provide an improvement in the gear-change apparatus of the type described above which overcomes the above-described disadvantages. A further object is to provide a gear-change mechanism of this type wherein as the reverse shift fork moves forward the forward shift fork is shifted a predetermined small stroke for stopping the inertial rotation of the input shaft and eliminating undesirable resistance to the forward movement of the reverse shift fork.

To this end, according to the present invention, a cam mechanism is provided between the reverse shift fork for shifting a reverse idler gear from the inoperative position to reverse gear train establishing position thereof and a forward shift fork for establishing one forward gear train, the cam mechanism being arranged such as to shift the forward shift fork by a predetermined small stroke sufficient for the synchronizing mechanism corresponding to the forward shift fork to effect only the synchronizing action thereof in response to the movement of the reverse shift fork from the inoperative position of the reverse idler gear to a position immediately before the reverse gear train establishing position of the reverse idler gear, and a recess is further provided in an interlocking plate which faces the shift piece of the forward shift fork when the change lever is shifted to the reverse position, the recess allowing the forward shift fork to be shifted by the above-described small stroke. In a second embodiment of this invention a one-way cam mechanism that effects a load relieving action when the reverse shift is moved backward to eliminate any undesirable resistance to movement to be caused by the forward shift fork.

When the reverse shift fork is actuated in order to establish the reverse gear train, first, the cam mechanism acts so as to shift a forward shift fork for establishing one forward gear train by a predetermined small stroke while the reverse shift fork is moving from the inoperative position of the reverse idler gear to a position immediately before the reverse geartrain establishing position of the reverse idler gear. As a consequence, the synchronizing mechanism corresponding to he forward gear train concerned is caused to effect only the synchronizing action thereof, whereby it is possible to infallibly suppress the inertial rotation of the input shaft. Accordingly, the reverse idler gear can be smoothly shifted to the reverse gear train establishing position without the generation of any abnormal gear noise by further moving the reverse shift fork.

During this operation, the recess of the interlocking plate allows the small-stroke shift of the forward shift fork. It is therefore possible to prevent the collision between the shift piece of the forward shift fork and the interlocking plate.

In the second embodiment the one-way cam mechanism effects a load relieving action whereby it is possible for the reverse shift fork to be moved easily from the reverse gear establishing position to the neutral position.

The preferred embodiments of the invention now will be described with reference to the accompanying drawings wherein.

The two embodiments of this invention illustrated in the drawings and as described below are identical in many respects and therefore only the first embodiment will be described in detail including all of the common components and functions, and then only the components and functions of the second embodiment that differ from those of the first embodiment will be described.

Figure 1:
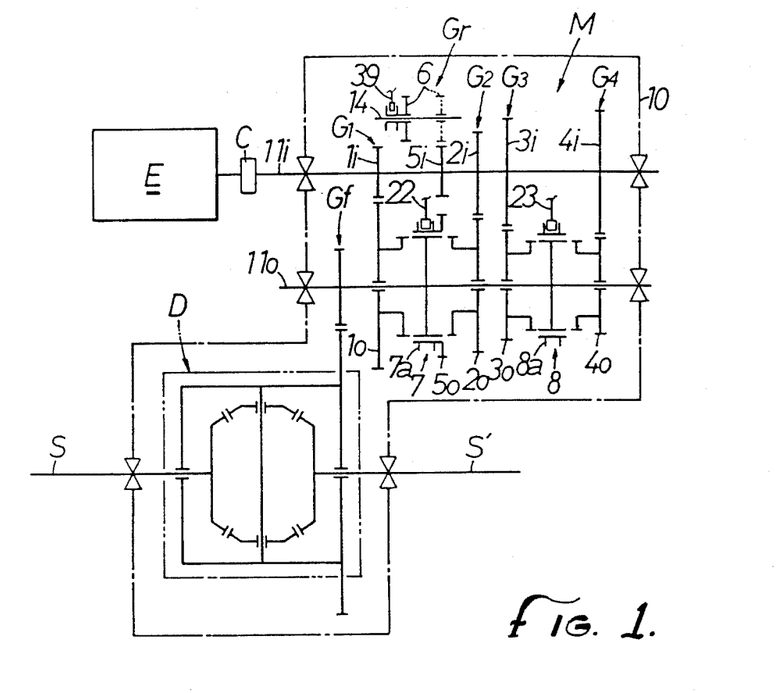
FIG. 1 is a schematic illustration of an automotive power unit equipped with a transmission of the type to which the present invention is applied.

FIG. 1 schematically shows an automotive power unit equipped with a transmission M which provides four forward speeds and one reverse and to which the present invention is applied. As shown in the Figure, the output of an engine E is transmitted from the engine crankshaft to drive shafts S and S' for driving right and left wheels, respectively, through a clutch C, the transmission M and a differential D in order to drive the shafts S and S'.

Input and output shafts $11i$ and $11o$ are supported by a transmission case 10 of the transmission M so as to be parallel to each other. Between the input and output shafts $11i$ and $11o$, a forward first-speed gear train G1, a reverse gear train Gr and forward second- to fourth-speed gear trains G2, G3 and G4 are provided in parallel and in that order from the side of the engine E. The first- to fourth-speed gear trains G1 to G4 are respectively comprised of input gears $1i$ to $4i$ secured to the input shaft $11i$ and output gears $1o$ to $4o$ rotatably supported by the output shaft $11o$ and constantly meshed with the corresponding input gears. Between the first-speed output gear $1o$ and the second-speed output gear $2o$ is provided a first- and second-speed synchronizing mechanism 7 which enables these gears to be alternately connected to the output shaft $11o$. Between the third-speed output gear $3o$ and the fourth-speed output gear $4o$ is provided a third- and fourth-speed synchronizing mechanism 8 which enables these gears to be alternately connected to the output shaft $11o$.

Thus, when either the first-speed output gear $1o$ or the second-speed output gear $2o$ is connected to the output shaft $11o$ through the first- and second-speed synchronizing mechanism 7, either the first-speed gear train G1 or the second-speed gear train G2 is established. When either the third-speed output gear $3o$ or the fourth-speed output gear $4o$ is connected to the output shaft $11o$ through the third- and fourth-speed synchronizing mechanism 8, either the third-speed gear train G3 or the fourth-speed gear train G4 is established. Any of the gear trains thus established transmits the output torque of the engine E from the input shaft $11i$ to the output shaft $11o$ with a predetermined gear ratio.

The torque transmitted to the output shaft $11o$ is further transmitted to the differential D through the final reduction gear train Gf.

The reverse gear train Gr is comprised of an input gear $5i$ secured to the input shaft $11i$, an output gear $5o$ cut in the slide sleeve $7a$ of the first- and second-speed synchronizing mechanism 7, and a reverse idler gear 6 which is slidably and rotatably supported on an intermediate shaft 14 disposed parallel between the input and output shafts $11i$ and $11o$ and which is movable between an operative position at which it meshes with both the input and output gears $5i$ and $5o$ at the same time and an inoperative position at which it is separated from these gears. Thus, when the reverse idler gear 6 is moved to the operative position at which it meshes with both the input and output gears, $5i$ and $5o$, the reverse gear train Gr is established, whereby the torque of the input shaft $11i$ can be transmitted to the output shaft $11o$ through the input gear $5i$, the reverse idler gear 6, the output gear $5o$ and the first- and second-speed synchronizing mechanism 7 so as to rotate the output shaft $11o$ in reverse.

The gear-change apparatus for establishing the first- to fourth-speed gear trains G1 to G4 and the reverse gear train Gr will next be described with reference to FIGS. 2 through 8.

Figure 2:
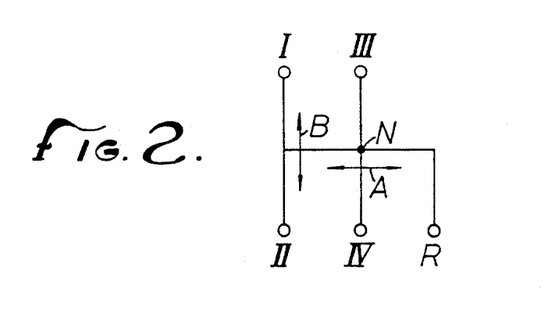
FIG. 2 illustrates the operating pattern of the gear-change lever for the transmission.

Referring first to FIG. 2 which shows the operation pattern of the change lever of the gear-change apparatus, the reference symbol N denotes the neutral position, I the first-speed position, II the second-speed position, III the third-speed position, IV the fourth-speed position, and R the reverse position.

Figure 3:
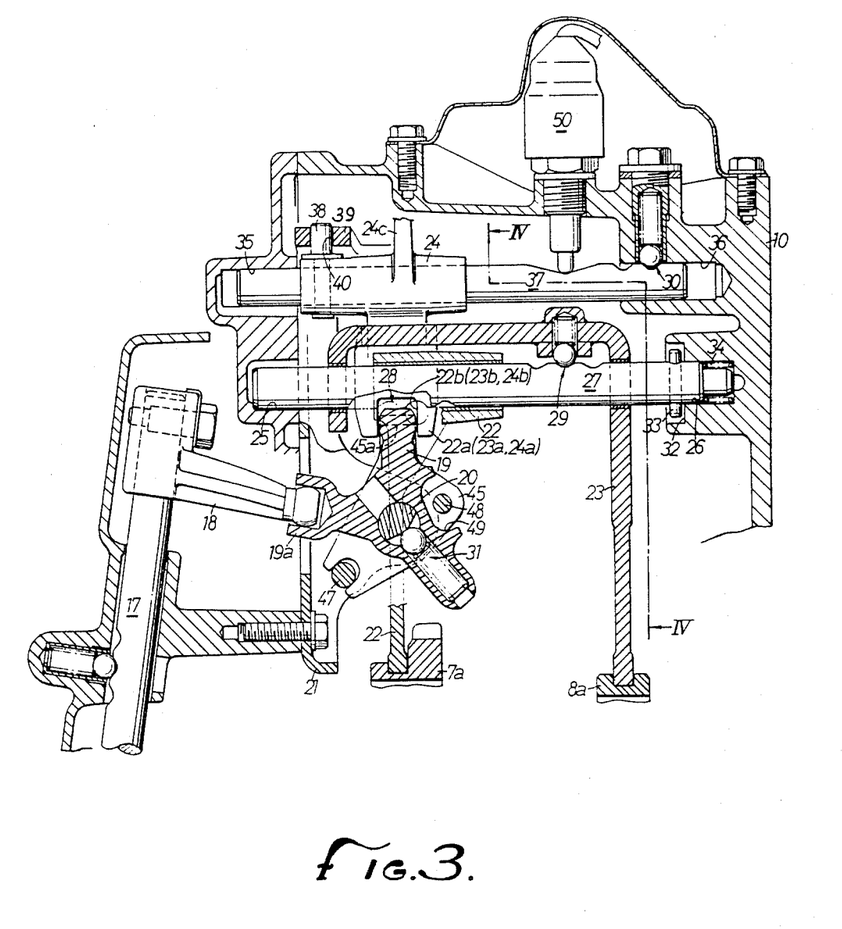
FIG. 3 is a vertical sectional front elevation view of the gear-change apparatus of the present invention.
Figure 4:
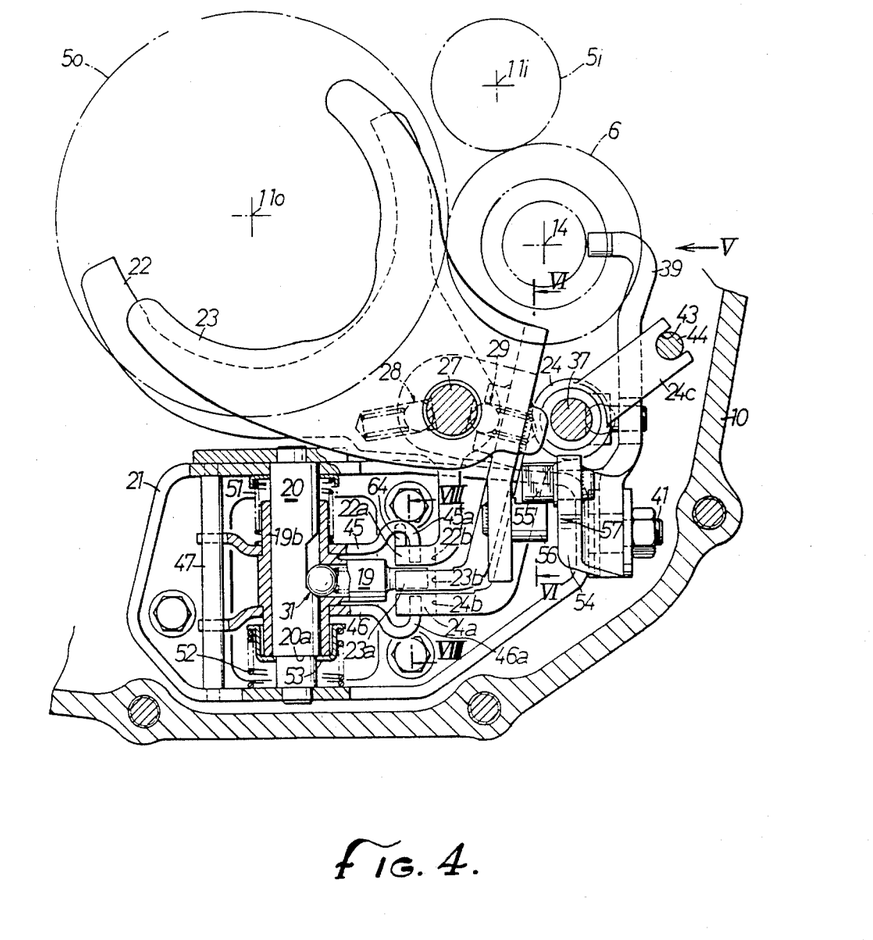
FIG. 4 is a sectional view taken along the line IV—IV in FIG. 3.

As shown in FIGS. 3 and 4, a change rod 17 interlocked with the change lever is slidably and rotatably supported by the transmission case 10. An actuating arm 18 which is secured to the distal end of the change rod 17 is connected to a driven arm $19a$ formed integrally with a shift arm 19. The shift arm 19 is pivotally and slidably supported by a support shaft 20 which extends orthogonally to the change rod 17. When the change lever is actuated in the select direction A as viewed in FIG. 2, the shift arm 19 is slid by the pivotal motion of the change rod 17, while when the change lever is actuated in the shift direction B, the shift arm 19 is pivoted by the slide motion of the change rod 17.

The support shaft 20 is supported by a support plate 21 secured to the transmission case 10.

Three shift pieces 22a, 23a and 24a are disposed along the locus of the slide movement of the distal end portion of the shift arm 19. When the change lever is actuated so as to select either the position I or II, the shift arm 19 engages with the engagement groove 22b of the upper shift piece 22a as viewed in FIG. 4; when the change lever is placed at the position N, that is, when either the position III or IV is selected, the shift arm 19 engages with the engagement groove 23a of the central shift piece 23a; and when the change lever is actuated so as to select the position R, the shift lever 19 engages with the engagement groove 24b of the lower shift piece 24a.

The upper shift piece 22a is integrally provided on a first- and second-speed shift fork 22 which engages with the slide sleeve 7a of the first- and second-speed synchronizing mechanism 7; the central shift piece 23a is integrally provided on a third- and fourth-speed shift fork 23 which engages with the slide sleeve 8a of the third- and fourth-speed synchronizing mechanism 8; and the lower shift piece 24a is integrally provided on a reverse shift member 24.

As shown in FIG. 3, both the first- and second-speed shift fork 22 and the third- and fourth-speed shift fork 23 are slidably supported by a fork shaft 27 which has both ends respectively fitted into a pair of support bores 25 and 26 of the transmission case 10 so as to be supported thereby. Accordingly, when the shift arm 19 is engaged with the upper shift piece 22a and is pivoted either clockwise or counterclockwise as viewed in FIG. 3, the first- and second-speed shift fork 22 is slid sidewards on the fork shaft 27, thereby enabling the first- and second-speed synchronizing mechanism 7 to be brought into the position for establishing either the first- or second-speed gear train G1 or G2. When the shift arm 19 is engaged with the central shift piece 23a and pivoted either clockwise or counterclockwise, the third- and fourth-speed shift fork 23 is slid sidewards on the fork shaft 27, thereby enabling the third- and fourth-speed synchronizing mechanisms 8 to be brought into the position for establishing either the third- or fourth-speed gear train G3 or G4.

Between the first- and second-speed shift fork 22 and the fork shaft 27 is provided a first detent means 28 for retaining the shift fork 22 at any one of the three positions in a regulated manner, that is, the inoperative position of the first- and second-speed synchronizing mechanism 7, the position at which the first-speed gear train G1 is established, and the position at which the second-speed gear train G2 is established. Between the third- and fourth-speed shift fork 23 and the fork shaft 27 is provided a second detent means 29 for retaining the shift fork 23 at any one of the three positions in a regulated manner, that is, the inoperative position of the third- and fourth-speed synchronizing mechanism 9, the position at which the third-speed gear train G3 is established, and the position at which the fourth-speed gear train G4 is established. Each of the detent means 28 and 29 has a known ball and notch type arrangement.

A pin 33 is secured to one end of the fork shaft 27 for preventing the fork shaft 27 from rotating, the pin 33 engaging with a rotation-preventing groove 32 formed in the transmission case 10. A retaining spring 34 is loaded in one of the support bores 25 and 26 of the transmission case 10 so as to press the end face of the fork shaft 27 against the end wall of the other support bore. Thus, the fork shaft 27 is prevented from moving within the support bores 25 and 26, and the positions of the shift forks 22 and 23 can thereby be stabilized.

Figure 5:
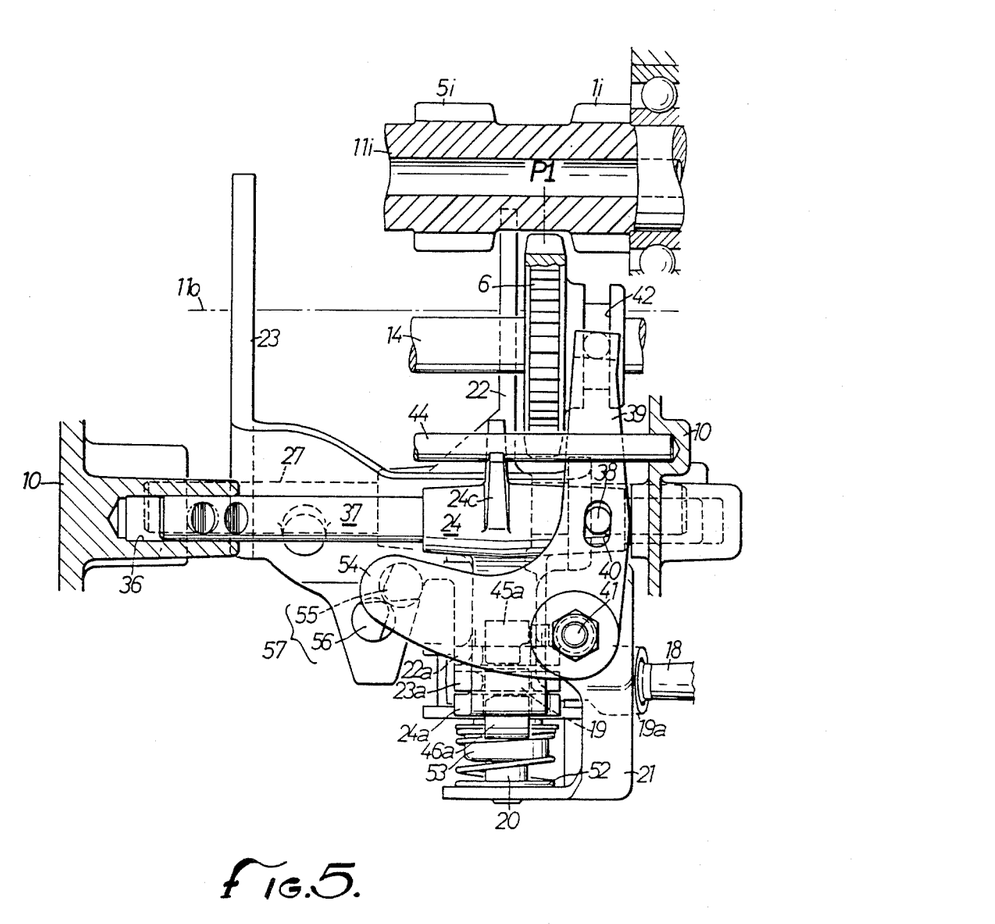
FIG. 5 is an elevation view of a portion of the gear-change apparatus viewed in the direction of arrow V in FIG. 4.

The reverse shift member 24 is secured to a reverse shift shaft 37 which is disposed parallel to the fork shaft 27 and which has both ends slidably fitted into another pair of support bores 35 and 36, respectively, provided in the transmission case 10 so as to be supported thereby. The reverse shift member 24 has a support arm 24c formed integrally therewith. A slide groove 43 is formed at the distal end of the support arm 24c. The support arm 24c has the slide groove 43 engaged with a fixed guide rod 44 parallel to the reverse shift shaft 37, thereby allowing the reverse shift member 24 to slide while preventing the rotation thereof. The reverse shift member 24 further has a drive pin 38 projecting from one side thereof. The drive pin 38 is engaged with a slot 40 formed in the intermediate portion of a reverse shift fork 39, as shown in FIG. 5. The reverse shift fork 39 is pivotally supported by the support plate 21 through a pivot shaft 41 and is engaged with an engagement groove 42 formed on the outer periphery of the boss portion of the reverse idler gear 6.

Thus, when the shift arm 19 is engaged with the lower shift piece 24a and pivoted clockwise as viewed in FIG. 3, the reverse shiftmember 24 moves to the right together with the reverse shift shaft 37, causing the drive pin 38 to pivot the reverse shift fork 39 counterclockwise as viewed in FIG. 5, whereby the reverse idler gear 6 can be shifted from the inoperative position P1 (see FIG. 5A) to the position P3 at which the reverse gear train Gr is established.

Figure 5A:
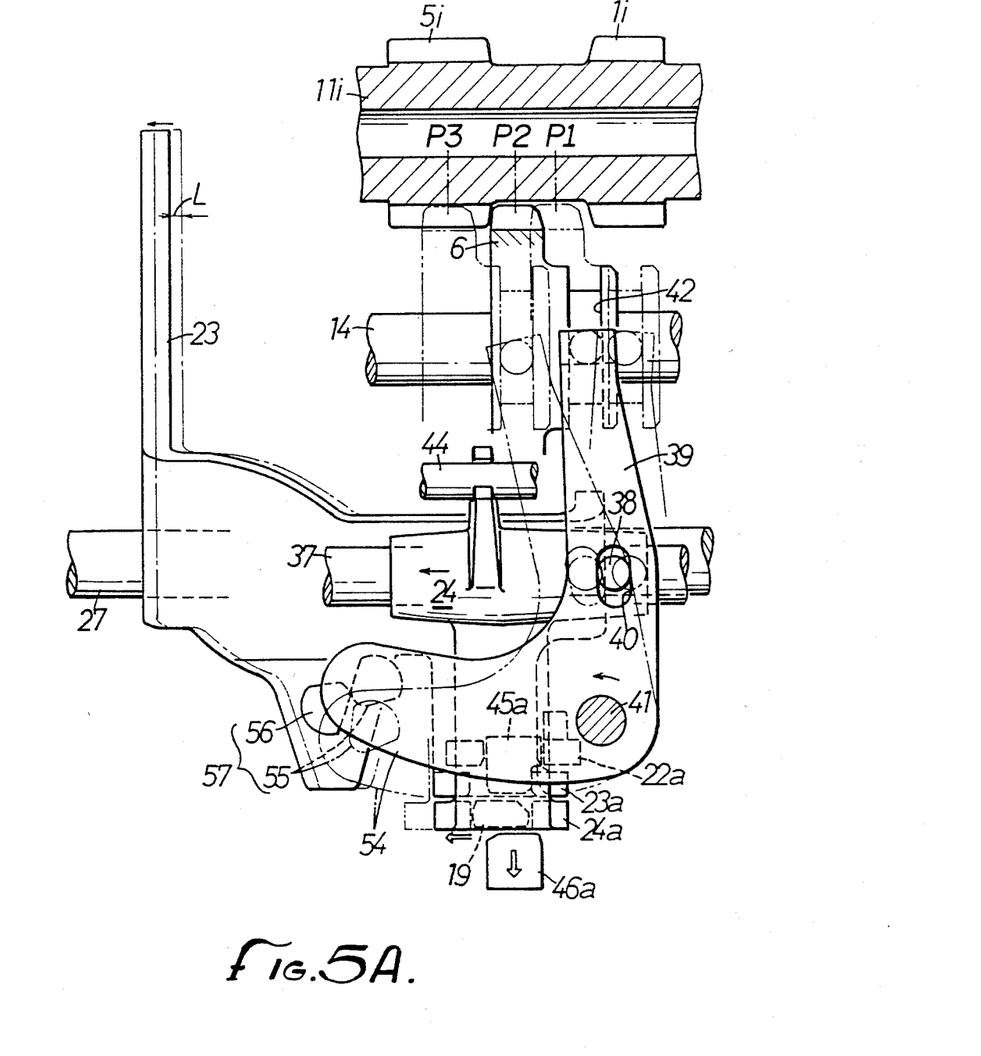
FIG. 5A is an enlarged view similar to FIG. 5 with portions of the apparatus shown in different positions by phantom lines for illustrating the operation of the apparatus.
Figure 6:
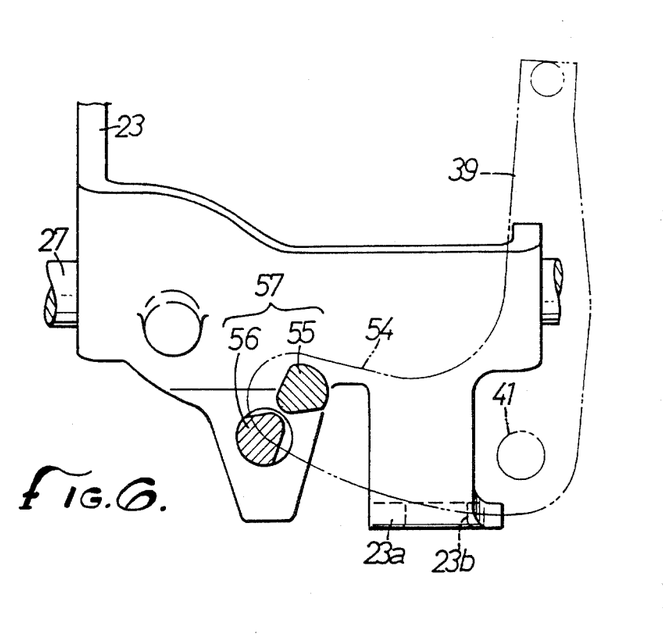
FIG. 6 is a sectional view taken along the line VI—VI in FIG. 4.
Figure 7:
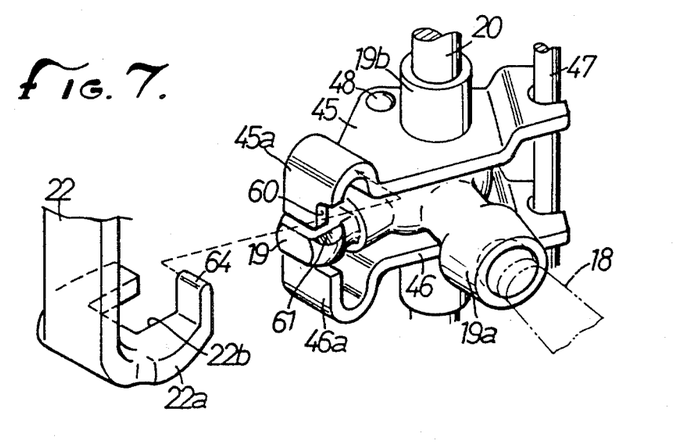
FIG. 7 is a partially exploded perspective view of an essential portion of the gear-change apparatus of this invention.

Between the reverse shift shaft 37 and the transmission case 10 is provided a third detent means 30 for retaining the reverse shift member 24 at either the inoperative position P1 of the reverse idler gear 6 of the position P3 at which the reverse gear train Gr is established. This detent means 30 also has a known ball and notch type arrangement.

Referring back to FIGS. 3 and 4, a pair of interlocking plates 45 and 46 are disposed on both sides of the shift arm 19, respectively. These interlocking plates 45 and 46 are fitted onto the boss 19b of the shift arm 19 and are slidably fitted into a rotation-preventing pin 47 which is secured to the support plate 21 so as to be parallel to the support shaft 20. Accordingly, the interlocking plates 45 and 46 can slide on the support shaft 20 together with the shift arm 19 but cannot pivot about the support shaft 20. However, the shift arm 19 is permitted to pivot.

Both ends of a stopper pin 48 which extends parallel to the support shaft 20 are respectively secured to the interlocking plates 45 and 46 by means of caulking. The stopper pin 48 is disposed within a limiting recess 49 provided on one side of the shift arm 19. Accordingly, when the shift arm 19 pivots, the pivoting angle of the shift arm 19, that is, the shift stroke of each of the shift forks 22, 23 and the shift member 24, is limited by the abutment between the stopper pin 48 and the end wall of the limiting recess 49.

The interlocking plates 45 and 46 have respective limiting pawls 45a and 46a which face each other across the distal end of the shift arm 19. When the shift arm 19 engages with one of the shift pieces (e.g., 23), these limiting pawls 45a and 46a respectively engage with the other two shift pieces (e.g. 22 and 24) so as to prevent the two shift pieces from undesirable operating movement.

A first return spring 51 is loaded between the outer surface of one interlocking plate 45 and the support plate 21. An annular shoulder portion 20a is formed at the end portion of the shift arm 19 on the side thereof which is remote from the interlocking plate 45. A position limiting plate 53 is disposed so as to face the shoulder portion 20a and the end portion of the shift arm 19 adjacent thereto. A second return spring 52 is loaded between the outer surface of the position limiting plate 53 and the support plate 21. The setting load of the second return spring 52 is selected to be larger than that of the first return spring 51.

Thus, the shift arm 19 is constantly urged so as to be placed at the position corresponding to the position N of the change lever, that is, the neutral position at which it engages with the shift piece 23a of the third- and fourth-speed shift fork 23, by the cooperation of the first and second return springs 51, 52 and the position limiting plate 53. When the shift arm 19 is slid against the resilient force of the first return spring 51, the arm 19 engages with the shift piece 22a of the first- and second-speed shift fork 22, while when the arm 19 is slid against the resilient force of the second return spring 52, the arm 19 engages with the shift piece 24a of the reverse shift member 24. A fourth detent means 31 for making the shift arm 19 effect the above slide motion in a regulated manner is provided between the shift arm 19 and the support shaft 20.

It is to be noted that the reference numeral 50 in FIG. 3 denotes a back-up light switch which is closed when the reverse shift member 24 is actuated to operate the vehicle backup lights.

Referring to FIG. 5, the reverse shift fork 39 is integrally provided with a pivoting arm 54 which faces the side surface of the third- and fourth-speed shift fork 23 in the axial direction of the fork shaft 27. A pair of drive and driven cams 55 and 56 are respectively fixed on the opposing surfaces of the pivoting arm 54 and the third- and fourth-speed shift fork 23. These cams 55 and 56 are formed such as to be able to shift, in cooperation with each other, the third- and fourth-speed shift fork 23 by the small stroke L (see FIG. 5A) in the direction in which the fourth-speed gear train G4 is established while the reverse shift fork 39 is moving the reverse idler gear 6 from the inoperative position to the position immediately before the position at which the reverse gear train Gr is established. The small stroke L is selected to be sufficient for the third- and fourth-speed synchronizing mechanism 8 to effect its synchronizing action but insufficient for the mechanism 8 to establish the fourth-speed gear train G4.

In this case, the fork shaft 27 is constantly held in position by means of the retaining spring 34 as described above, which is extremely effective in accurately obtaining the predetermined small stroke L of the third- and fourth-speed shift fork 23 by the action of the cams 55 and 56.

Accordingly, when, for the purposes of establishing the reverse gear train Gr, the clutch C is first disengaged and the change lever is then shifted from the R-select position to the R-shift position, the shift arm 19 actuates the reverse shift member 24 so as to pivot the reverse shift fork 39 counterclockwise as viewed in FIG. 5. Thereupon, while the reverse idler gear 6 is being shifted by the fork 39 from the inoperative position P1 to the position P2 immediately before the position at which the reverse gear train Gr is established as shown in FIG. 5A, the pivoting motion of the pivoting arm 54 causes the drive cam 55 to push the driven cam 56 so that the third- and fourth-speed shift fork 23 is shifted by a predetermined small stroke L in the direction in which the fourth-speed gear train G4 is established. Thus, it is possible to stop or reduce the inertial rotation of the input shaft 11i by obtaining only the synchronizing action of the third- and fourth-speed synchronizing mechanism 8. Then, the reverse idler gear 6 is shifted to the position P3 at which the reverse gear train Gr is established by advancing the above pivoting motion of the reverse shift fork 39, thereby allowing the reverse idler gear 6 to be smoothly meshed with the input and output gears 5i and 5o without generation of any abnormal gear noise.

In the above-described arrangement, the pivoting arm 54 and the drive and driven cams 55, 56 constitute in combination a cam mechanism 57 according to the present invention. It is to be noted that at least one of the cams 55 and 56 is preferably constituted by a roller to enable the cam mechanism 57 to operate smoothly.

Figure 8:
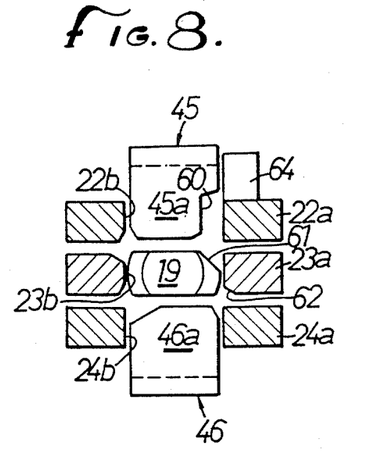
FIG. 8 is a sectional view taken along the line VIII—VIII in FIG. 4.
Figure 8A:
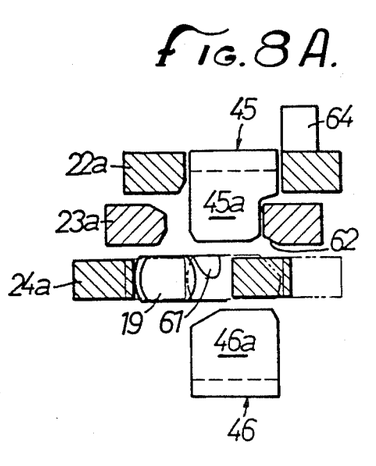
FIGS. 8A and 8B are views similar to FIG. 8 illustrating the components in different operating positions.
Figure 8B:
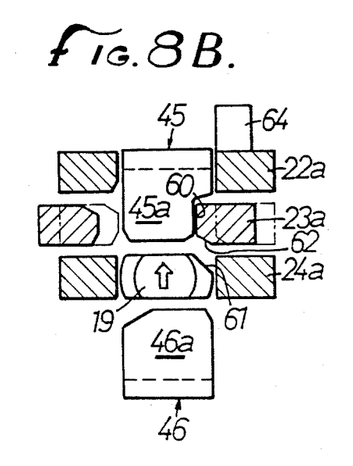
Figure 9:
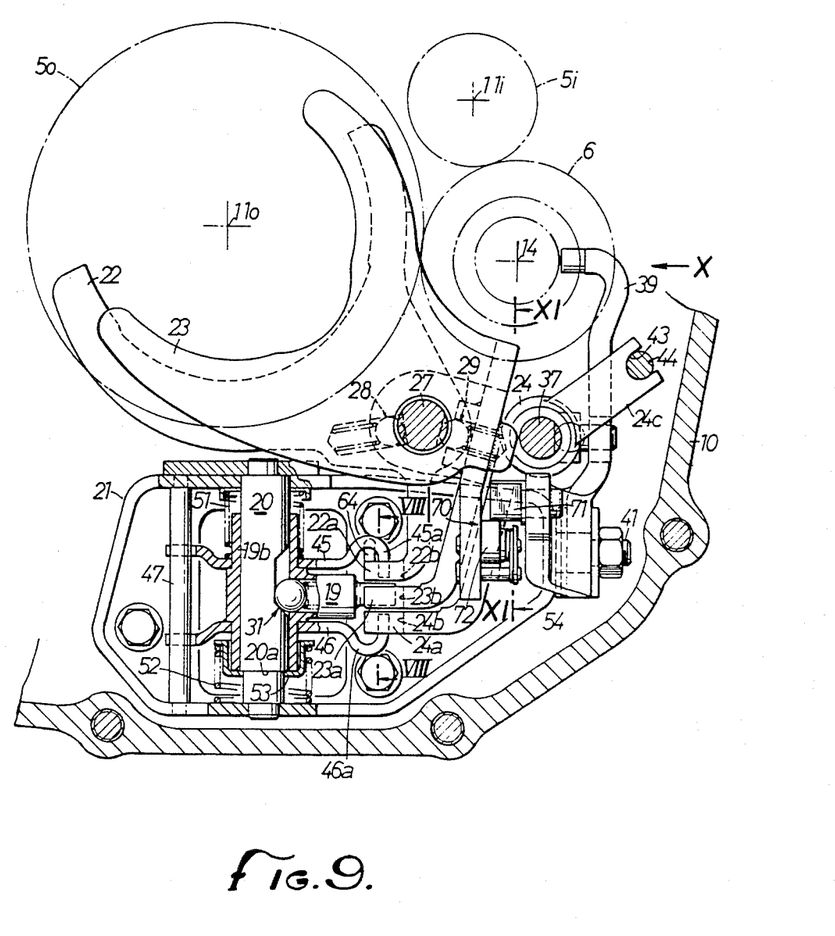
FIG. 9 is a sectional view similar to FIG. 4 of a second embodiment of the gear-change mechanism of the present invention.

In order to allow the third- and fourth-speed shift fork 23 to move the predetermined small stroke L in the direction in which the fourth-speed gear train G4 is established when the reverse shift member 24 is actuated, a recess 60 is provided on one side of the limiting pawl 45a of the interlocking plate 45 which engages with the shift piece 23a of the third- and fourth-speed shift fork 23, as shown in FIG. 8. As a consequence, when the third- and fourth-speed shift fork 23 is shifted slightly in the direction in which the fourth-speed gear train G4 is established, a portion of the shift piece 23a enters the recess 60 as shown in FIG. 8A, whereby it is possible to avoid the interference between the shift piece 23a and the limiting pawl 45a of the interlocking plate 45.

Slanted surfaces 61 and 62 are respectively formed at the corner of the shift arm 19 and the corner of the portion of the shift piece 23a entering the recess 60 of the limiting pawl 45a, these corners facing each other.

Thus, when the change lever is returned from the R-shift position to the position N shown in FIG. 2 for the purpose of cancelling the establishment of the reverse gear train Gr, the shift arm 19 first causes the shift pieces 24a to move backwards so as to return the reverse idler gear 6 to the inoperative position P1. As a consequence, the shift arm 19 and the interlocking plates 45 and 46 are returned to the neutral position corresponding to the position N shown in FIG. 2 by the cooperation of the first and second return springs 51, 52 and the position limiting plate 53. In the course of this movement, the slanted surface 61 of the shift arm 19 engages the slanted surface 62 of the shift piece 23a, thereby causing the shift piece 23a to return to its initial position.

When the shift arm 19 takes the neutral position, the recess 60 of the limiting pawl 45a of the interlocking plate 45 faces the shift piece 22a of the first- and second-speed shift fork 22, as shown in FIG. 8. Therefore, in order to prevent the shift piece 22a from entering the recess 60, a stopper 64 is integrally provided on the outer surface of the shift piece 22a, the stopper 64 projecting so as to face the outer surface of the limiting pawl 45a. Accordingly, even when the recess 60 faces the shift piece 22a, it is possible to prevent the first- and second-speed shift fork 22 from undesirably moving in the direction in which the second-speed gear train G2 is established by the abutment between the stopper 64 and the outer surface of the limiting pawl 45a.

As has been described above, according to the first embodiment of the present invention, a cam mechanism is provided between the reverse shift fork for shifting the reverse idler gear from the inoperative position to reverse gear train establishing position thereof and the forward shift fork for establishing one forward gear train. The cam mechanism is arranged such as to shift the forward shift fork by a predetermined small stroke sufficient for the synchronism mechanism corresponding to a forward shift fork to effect only the synchronizing action thereof in response to the movement of the reverse shift fork from the inoperative position to reverse gear train establishing position of the reverse idler gear, and the recess is further provided in the interlocking plate which faces the shift piece of the forward shift fork when the change lever is shifted to the reverse position, the recess allowing the forward shift fork to be shifted by the above-described small stroke. By virtue of this arrangement, when the reverse shift fork is actuated, only the synchronizing action of the synchronizing mechanism corresponding to the forward gear train concerned can be satisfactorily effected, whereby it is possible to reliably suppress the inertial rotation of the input shaft and hence prevent the generation of any abnormal gear noise, irrespective of the reverse shift fork operating speed. In addition, during the above-described operation, there is no risk of the shift piece of the forward shift fork and the interlocking plate colliding with each other. Accordingly, no collision noise is generated, and the durability of these members is not impaired.

Turning now to the second embodiment of this invention as shown in detail in FIGS. 9 through 12, it should be noted that the automotive power unit illustrated in FIG. 1, the operating pattern for the gear-change lever shown in FIG. 2, and the portion of the gear-change mechanism shown in FIG. 3 for this second embodiment are all identical to the first embodiment and will not be redescribed here. This second embodiment employs a cam mechanism 70 which differs from the cam mechanism 57 described with respect to the first embodiment.

Figure 10:
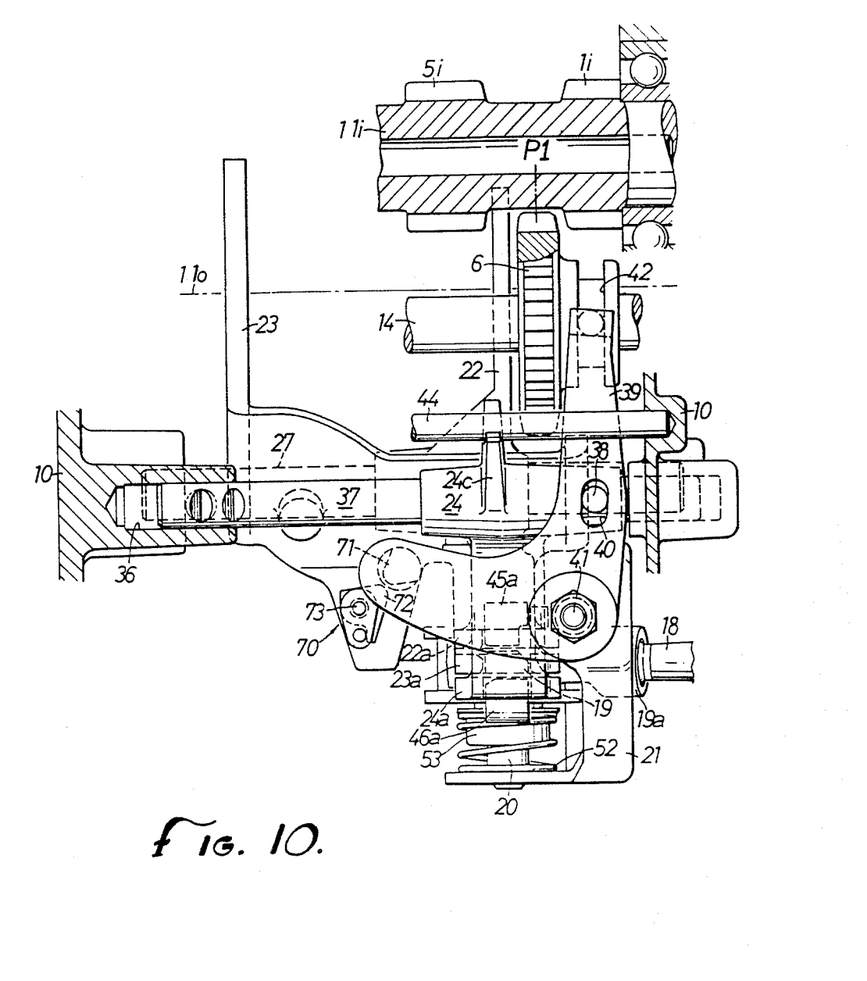
FIG. 10 is an elevation view, similar to FIG. 5, of a portion of the second embodiment of the gear-change mechanism viewed in the direction of arrow X in FIG. 9.

Referring to FIG. 10, a one-way cam mechanism 70 in this second embodiment is provided between the pivoting arm 54 and the third- and fourth-speed shift fork 23 instead of the afore-described cam mechanism 57. As shown in FIGS. 11 and 12, the one-way cam mechanism 70 has a drive cam 71 formed integrally with the pivoting arm 54 and a driven cam 72 pivotally provided on the third- and fourth-speed shift fork 23 through a pivot shaft 73. The one-way cam mechanism 70 is arranged such that when the pivoting arm 54 pivots in response to the shift of the reverse shift fork 39, the drive cam 71 pushes the driven cam 72 by a predetermined small stroke L (see FIG. 10A) in the direction in which the third- and fourth-speed shift fork 23 establishes the fourth-speed gear train G4. The stroke L by which the drive cam 71 pushes the driven cam 72 is selected to be sufficient for the third- and fourth-speed synchronizing mechanism 8 to effect its synchronizing action but insufficient for the mechanism 8 to establish the fourth-speed gear train G4.

The driven cam 72 has a stopper arm 72a integrally provided on one side thereof and the arm 72a separately abuts against one side surface of a stopper pin 75 secured to the third- and fourth-speed shift fork 23. A return spring 74 which urges the stopper arm 72a in the direction for abutting against the stopper pin 75 by a relatively weak force is stretched between the driven cam 72 and the stopper pin 75. By virtue of this arrangement, when the pivoting arm 54 pivots in the forward direction a (see FIG. 11) in response to the forward movement of the reverse shift fork 39, the driven cam 72 when pushed by the drive cam 71 is prevented from rotating by the stopper arm 72a abutting against the stopper pin 75. However, when the pivoting arm 54 pivots in the return direction b in response to the return movement of the reverse shift fork 39, the driven cam 72 when pushed by the drive cam 71 rotates about the pivot shaft 73 against the force of the return spring 74. The rotation of the driven cam 72 about the pivot shaft 73 provides the load relieving action of the one-way cam mechanism 70.

Figure 10A:
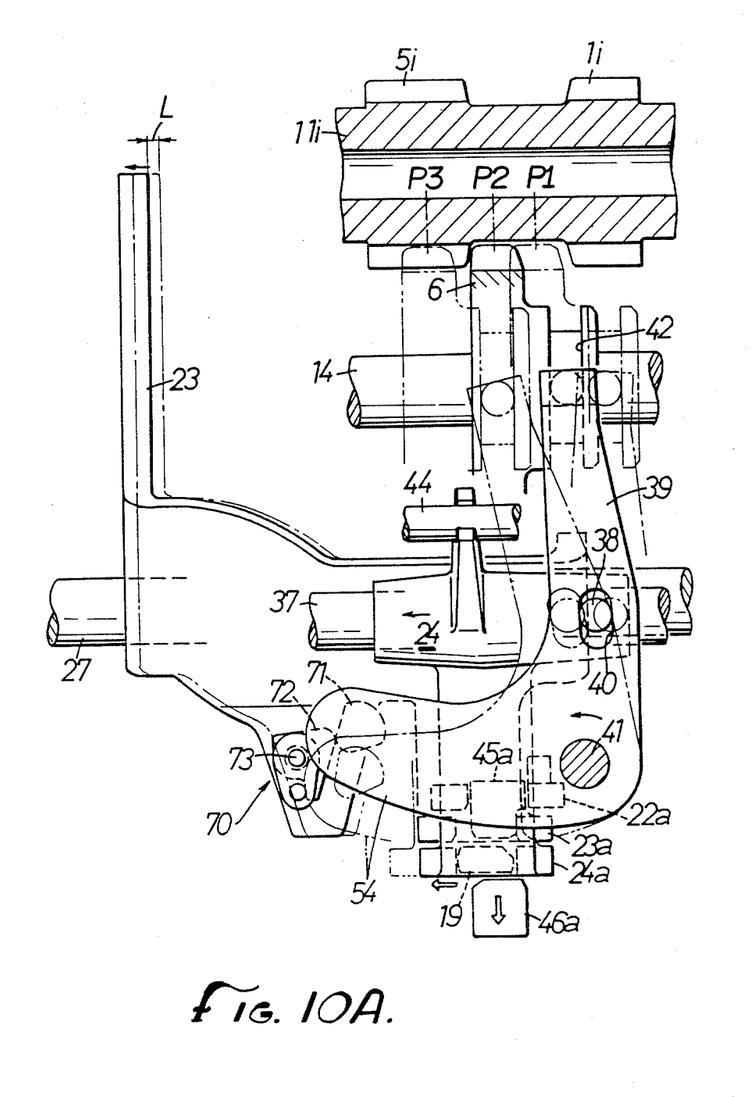
FIG. 10A is an enlarged view similar to FIG. 10 with portions of the apparatus shown in different positions by phantom lines for illustrating the operation of the second embodiment of the apparatus.
Figures 11, 12:
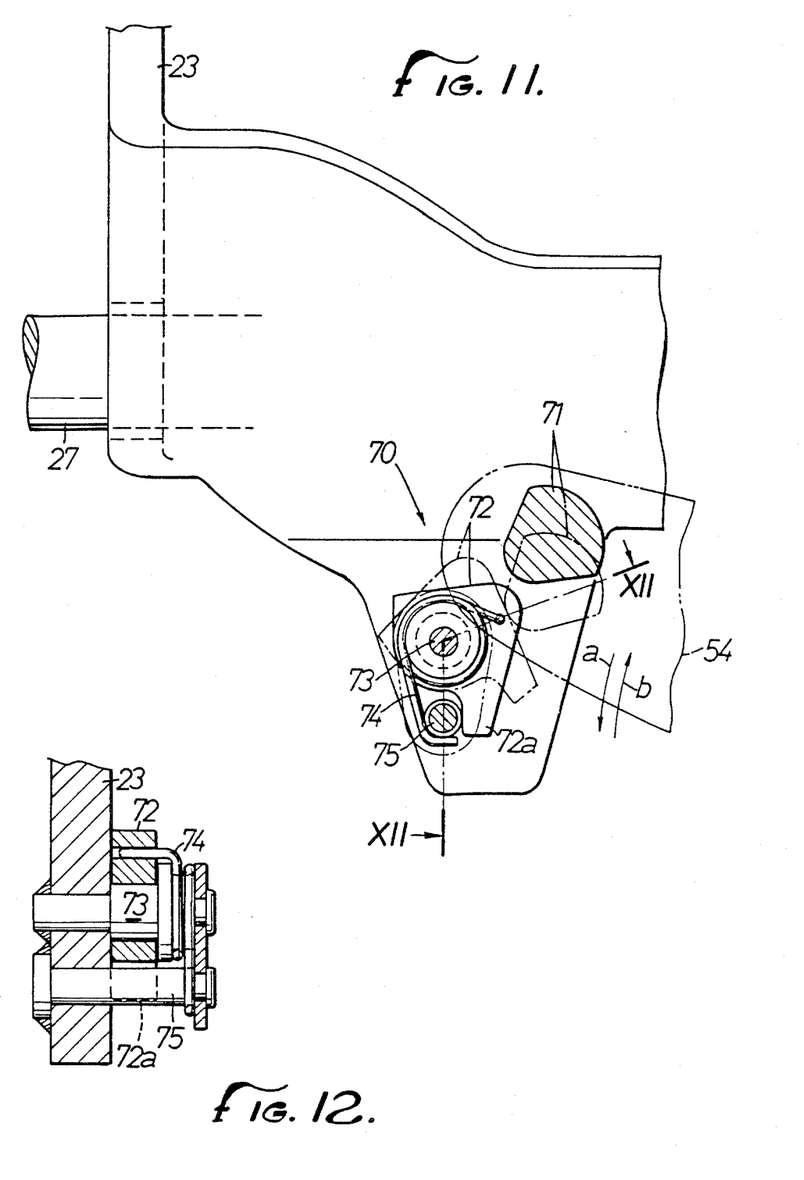
FIG. 11 is a sectional view taken along the line XI—XI in FIG. 9.
FIG. 12 is a sectional view taken along the line XII—XII in FIG. 11.

Here, as with the first embodiment, when, for the purpose of establishing the reverse gear train Gr, the clutch C is first disengaged and the change lever is then shifted from the R-select position to the R-shift position, the shift arm 19 actuates the reverse shift member 24 so as to pivot the reverse shift fork 39 counterclockwise as viewed in FIG. 10A. Thereupon, while the reverse idler gear 6 is being shifted by the fork 39 from the inoperative position P1 to the position P2 immediately before the position at which the reverse gear train Gr is established as shown in FIG. 10A, the pivoting motion of the pivoting arm 54 in the forward direction a (see FIG. 11) causes the drive cam 71 to push or engage the driven cam 72. In this case, the driven cam 72 has the stopper arm 72a abutting against the stopper pin 75 and therefore is unable to rotate. Accordingly, the driven cam 72, together with the third- and fourth-speed shift fork 23, is shifted by a predetermined small stroke L in the direction in which the fourth-speed gear train G4 is established. Thus, it is possible to stop or reduce the inertial rotation of the input shaft 11i by obtaining only the synchronizing action of the third- and fourth-speed synchronizing mechanism 8. Then, the reverse idler gear 6 is shifted to the position at which the reverse gear train Gr is established by advancing the above pivoting motion of the reverse shift fork 39, thereby allowing the reverse idler gear 6 to be smoothly meshed with the input and output gears 5i and 5o without generation of any abnormal gear noise.

In this case, the fork shaft 27 is constantly held in position by means of the retaining spring 34 thereby to stabilize the position of the third- and fourth-speed shift fork 23 as described above, which is extremely effective in accurately obtaining the predetermined small stroke L of the third- and fourth-speed shift fork 23 by the action of the cams 71 and 72.

When the reverse shift fork 39 is pivoted clockwise as viewed in FIG. 10 for the purpose of cancelling the establishment of the reverse geartrain Gr, the drive cam 71 is caused to push the driven cam 72 again by the pivoting motion of the pivoting arm 54 in the backward direction b in response to the motion of the fork 39. In this case, however, the driven cam 72 rotates about the pivot shaft 73 against the weak force of the return spring 74, as shown by the phantom line in FIG. 11. It is therefore possible for the reverse shift fork 39 to be lightly returned to its initial position without encountering any significant resistance offered by the driven cam 72 and the third- and fourth-speed shift fork 23.

In all other respects this second embodiment functions in the same manner as the first embodiment. According to this second embodiment of the present invention, the one-way cam mechanism is provided between the reverse shift fork for shifting the reverse idler gear from the inoperative position to reverse gear train establishing position thereof and the forward shift fork for establishing one forward gear train, whereby when the reverse shift fork is moved forwards, the cam mechanism shifts the forward shift fork by a predetermined small stroke sufficient for the synchronizing mechanism corresponding to the forward shift fork to effect only the synchronizing action thereof while the reverse shift fork is moving from the inoperative position to reverse gear train establishing position of the reverse idler gear, and yet when the reverse shift fork is moved backwards, the cam mechanism effects load relieving action so as to avoid the reverse shift fork encountering any resistance offered by the forward shift fork. By virtue of this arrangement, when the reverse shift fork is moved backwards, the forward shift fork is shifted by a predetermined small stroke by the one-way cam mechanism, thereby infallibly suppressing the inertial rotation of the input shaft the same as with the first embodiment. When the reverse shift fork is moved backwards, any undesirable resistance is avoided by the load relieving action of the one-way cam mechanism, whereby the reverse shift fork can be lightly moved backwards. Thus, the operating feeling is improved.

The invention is claimed:

1. In a gear-change apparatus for a vehicular transmission having a plurality of forward gear trains each established through an associated synchronizing mechanixm, and a reverse gear train established by axial movement on a shaft of a reverse idler gear, an improvement comprising:
a cam mechanism having a first cam fixed in place on a reverse shift fork for shifting said reverse idler gear from an inoperative position to an engaged reverse gear train position thereof and, a second cam fixed in place on a forward shift fork for establishing one forward gear train, said first and second cams being arranged such that when said reverse shift fork is moved in a direction which causes said first cam to engage said second cam said forward shift fork is shifted by a predetermined small stroke sufficient for the synchronizing mechanism of that one forward gear corresponding to said forward shift fork to effect only the synchronizing action thereof in response to the movement of said reverse shift fork from the inoperative position of said reverse idler gear to a position immediately before the engaged reverse gear train position of said reverse idler gear; and
a recess having a depth corresponding to the small stroke provided in an interlocking plate which faces a shift piece of said forward shift fork when said apparatus is shifted to the reverse position for allowing said forward shift fork to be shifted the small stroke.

2. The improved gar-change apparatus of claim 1 wherein a shift arm is movable with said inter locking plate into and out of alignment with said shift piece, and slanted surfaces on said shift arm and shift piece located for interengagement for said shift arm to return the shift piece from the recess to a neutral position upon shifting of the apparatus out of the reverse position.

3. In a gear-change apparatus for a vehicular transmission having a plurality of forward gear trains each established through an associated synchronizing mechanism, and a reverse gear train established by axial movement of a shaft of a reverse idler gear, an improvement comprising:
a cam mechanism having a first cam fixed in place on a reverse shift fork for shifting said reverse idler gear from an inoperative position to an engaged reverse gear train position thereof and, a second cam fixed in place on a forward shift fork for establishing one forward gear train, said first and second cams being arranged such as to shift said forward shift fork by a predetermined small stroke sufficient for the synchronizing mechanism of that one forward gear corresponding to said forward shift fork to effect only the synchronizing action thereof in response to the movement of said reverse shift fork from the inoperative postion of said reverse idler gear to a position immediately before the engaged reverse gear train position of said reverse idler gear;
a recess having a depth corresponding to the small stroke provided in an interlocking plate which faces a shift piece of said forward shift fork when said apparatus is shifted to the reverse position for allowing said forward shift fort to be shifted hhe small stroke; and
a second shift piece having means for engaging a portion of said interlocking plate for preventing movement of said second shift piece into said recess in a gear shifting motion of said second shift piece.

4. In a gear-change apparatus for a vehiculr transmission having a plurality of forward gear trains each established through an associated synchronizing mechanism, and a reverse gear train established by axial movement of a shaft of a reverse idler gear, an improvement comprising;
a one-way cam mechanism having a first cam integrally formed on a reverse shift fork for shifting said reverse idler gear from an inoperative position to an engaged reverse gear train position thereof and a pivotable second cam disposed on a forward shift fork for establishing one forward gear train, said first and second cams being arranged such that when said reverse shift fork if moved in a direction which causes said first cam to engage said second cam said forward shift fork is shifted by a predetermined small stroke sufficient for the synchronizing mechanism of forward gear corresponding to said forward shift fork to effect only the synchronizing action thereof while said reverse shift fork is moving from the inoperative postition of said reverse idler gear to a position immediately before the engaged reverse gear train position of said reverse idler gear, said second cam effecting a load relieving action when said reverse shift fork is moved to disengage said first and second cams so as to avoid said reverse shift fork encountering any resistance offered by said forward shift fork.

5. The improved gear-change apparatus of claim 4 wherein a recess is provided in an interlocking plate which faces a shift piece of said forward shift fork said recess allowing said forward shift fork to be shifted said small stroke when the apparatus is shifted to the reverse position.

6. The improved gear-change apparatus of claim 5, wherein means are provided on a second shift piece for engaging a portion of said interlocking plate for preventing movement of said second shift piece into said recess in a gear shifting motion of said second shift piece.

7. The improved gear-change apparatus of claim 5, wherein said shift piece has slanted surfaces and wherein a shift arm having slanted surfaces is movable with said interlocking plate into and out of alignment with said shift piece, said slanted surfaces on said shift arm and shift piece engaging each other to return the shift piece to an inoperative position from the engaged reverse position, wherein said shift piece is located in said recess.

8. A gear-change apparatus for a transmission having a plurality of forward gear trains engaged through an associated synchronizing mechanism and a reverse gear train engaged by axial movement on a shaft of a reverse idler gear, comprising:

a spring biased driven cam pivotably disposed on a pivot shaft on a forward shift fork for engaging a forward gear train, with said driven cam biased against a stopper pin;

a driver cam disposed on and integral with a reverse shift fork, said driven cam and said driver cam positioned with respect to each other such that as the engagement of the reverse gear train is initiated upon movement of the reverse shift fork from a neutral position, said driver cam engages sad driven cam and thereby displaces said forward shift fork by a predetermined small stroke, with said cams remining in contact during the engagement of the reverse gear train, said driven cam pivoting against said driver cam as the reverse shift fork moves back to the neutral position.

* * * * *

UNITED STATES PATENT AND TRADEMARK OFFICE
CERTIFICATE OF CORRECTION

PATENT NO. : 4,785,681
DATED : November 22, 1988
INVENTOR(S) : Hideki Kuratsu, Yoshihiro Yoshimura, Noboru Sekine, Yasuo Kima It is certified that error appears in the above-identified patent and that said Letters Patent is hereby corrected as shown below:

Column 11, line 31 correct the spelling of "mechanism".

Column 11, line 59 change "gar" to --gear--.

Column 11, line 60 change "inter locking" to --interlocking--.

Signed and Sealed this

Third Day of April, 1990

*Attest:*

HARRY F. MANBECK, JR.

*Attesting Officer*  *Commissioner of Patents and Trademarks*